US008563652B2

(12) United States Patent
Schmidt et al.

(10) Patent No.: US 8,563,652 B2
(45) Date of Patent: Oct. 22, 2013

(54) POLYMER MATERIAL AND METHOD FOR THE PRODUCTION THEREOF

(75) Inventors: Harald Schmidt, Emmerich (DE); Christoph Hess, Kleve (DE); Johannes Mathar, GP's-Heerenberg (NL); Ralf Hackfort, Emmerich (DE)

(73) Assignee: Biotec Biologische Naturverpackungen GmbH & Co. KG, Emmerich (DE)

( * ) Notice: Subject to any disclaimer, the term of this patent is extended or adjusted under 35 U.S.C. 154(b) by 238 days.

(21) Appl. No.: 12/739,396

(22) PCT Filed: Oct. 22, 2008

(86) PCT No.: PCT/EP2008/064269
§ 371 (c)(1),
(2), (4) Date: Apr. 22, 2010

(87) PCT Pub. No.: WO2009/053382
PCT Pub. Date: Apr. 30, 2009

(65) Prior Publication Data
US 2010/0305240 A1 Dec. 2, 2010

(30) Foreign Application Priority Data
Oct. 22, 2007 (DE) .......................... 10 2007 050 770

(51) Int. Cl.
C08B 31/00 (2006.01)
C08G 63/48 (2006.01)
C08G 63/91 (2006.01)
C08G 59/14 (2006.01)
C08F 16/06 (2006.01)
C08F 116/06 (2006.01)
C08F 216/06 (2006.01)
C08F 283/00 (2006.01)
C08L 63/00 (2006.01)

(52) U.S. Cl.
USPC ...................... 525/54.26; 525/54.24; 525/523

(58) Field of Classification Search
USPC .................... 525/54.26, 54.24, 409, 523, 403
See application file for complete search history.

(56) References Cited

U.S. PATENT DOCUMENTS

| 5,409,973 A * | 4/1995 | Bastioli et al. ........... 524/53 |
| 5,412,005 A * | 5/1995 | Bastioli et al. ........... 524/47 |
| 5,510,401 A * | 4/1996 | Dehennau et al. ........ 524/47 |
| 5,589,518 A * | 12/1996 | Bastioli et al. ........... 521/55 |
| 5,635,550 A | 6/1997 | Dehennau et al. |
| 5,736,586 A * | 4/1998 | Bastioli et al. ........... 521/84.1 |
| 5,773,495 A * | 6/1998 | Haschke et al. .......... 524/52 |
| 5,801,207 A * | 9/1998 | Bastioli et al. ........... 521/84.1 |
| 5,821,286 A * | 10/1998 | Xu et al. ................. 524/47 |
| 5,844,023 A * | 12/1998 | Tomka .................... 524/47 |
| 5,854,345 A * | 12/1998 | Xu et al. ................. 525/54.24 |
| 6,096,809 A * | 8/2000 | Lorcks et al. ............ 524/47 |
| 6,117,925 A * | 9/2000 | Tomka .................... 524/47 |
| 6,136,097 A * | 10/2000 | Lorcks et al. ............ 127/32 |
| 6,214,907 B1 * | 4/2001 | Tomka .................... 524/47 |
| 6,218,321 B1 * | 4/2001 | Lorcks et al. ............ 442/165 |
| 6,231,970 B1 * | 5/2001 | Andersen et al. ......... 428/332 |
| 6,235,815 B1 * | 5/2001 | Loercks et al. ........... 524/47 |
| 6,235,816 B1 * | 5/2001 | Lorcks et al. ............ 524/47 |
| 6,242,102 B1 | 6/2001 | Tomka |
| 6,472,497 B2 * | 10/2002 | Loercks et al. ........... 528/196 |
| 6,479,164 B1 * | 11/2002 | Lorcks et al. ............ 428/532 |
| 6,515,054 B1 * | 2/2003 | Matsushita et al. ...... 524/167 |
| 6,730,378 B2 * | 5/2004 | Matsuoka et al. ........ 428/35.7 |
| 6,730,724 B1 * | 5/2004 | Bastioli et al. ........... 524/47 |
| 6,821,588 B1 * | 11/2004 | Hammer et al. .......... 428/34.8 |
| 6,844,380 B2 * | 1/2005 | Favis et al. .............. 524/52 |
| 6,893,527 B1 * | 5/2005 | Doane et al. ............. 156/244.11 |
| 7,608,649 B2 * | 10/2009 | Sun et al. ................ 524/47 |
| 2001/0007883 A1 * | 7/2001 | Willett et al. ............ 524/47 |
| 2001/0039303 A1 * | 11/2001 | Loercks et al. ........... 524/47 |
| 2003/0092793 A1 | 5/2003 | Liu et al. |
| 2003/0100635 A1 * | 5/2003 | Ho et al. ................. 524/47 |
| 2003/0119949 A1 * | 6/2003 | Favis et al. .............. 524/47 |
| 2003/0141637 A1 * | 7/2003 | Kesselmans et al. ..... 264/555 |
| 2003/0187149 A1 * | 10/2003 | Schmidt et al. ........... 525/418 |
| 2004/0096656 A1 * | 5/2004 | Bond ..................... 428/373 |
| 2005/0137356 A1 * | 6/2005 | Hale et al. ............... 525/421 |
| 2005/0154114 A1 * | 7/2005 | Hale ...................... 524/436 |
| 2005/0171249 A1 * | 8/2005 | Wang et al. .............. 524/47 |
| 2006/0264539 A1 * | 11/2006 | Mosseveld et al. ....... 524/47 |
| 2007/0042207 A1 * | 2/2007 | Berger et al. ............ 428/480 |

(Continued)

FOREIGN PATENT DOCUMENTS

CN 1833002 9/2006
DE 198 22 979 12/1999

(Continued)

OTHER PUBLICATIONS

071505WO International Preliminary Report on Patentability—PCT/EP2008/064269.
070555WO International Preliminary Report on Patentability—PCT/EP2008/064270.
Kim et al., "Reactive Blends of Gelatinized Starch and Polycaprolactone-G-Glycidyl Methacrylate", Journal of Applied Polymer Science, Aug. 8, 2001.
Lee et al., "Process for preparing biodegradable resin compositions", Chemical Abstracts Service, Columbus, OH, Database accession No. 136:341532, Abstract.
Office Action in Japanese Application No. JP2010-530437 dated Jul. 30, 2013.

(Continued)

Primary Examiner — Liam Heincer
(74) Attorney, Agent, or Firm — Workman Nydegger

(57) ABSTRACT

A thermoplastic polymer material containing starch is shown and described, which can be obtained by homogenizing a mixture containing 40 to 85 wt.-% starch and/or starch derivative, 15 to 55 wt.-% softener, and 0.01 to 7 wt.-% of a polymer which contains an epoxy group, while supplying thermal and/or mechanical energy and setting the water content of the mixture to less than approximately 12 wt.-%. The polymer material according to the invention is characterized by outstanding mechanical properties.

50 Claims, 2 Drawing Sheets

(56) References Cited

U.S. PATENT DOCUMENTS

| | | | |
|---|---|---|---|
| 2007/0082982 A1* | 4/2007 | Noda et al. | 524/47 |
| 2007/0129468 A1* | 6/2007 | Bastioli et al. | 524/47 |
| 2007/0231554 A1* | 10/2007 | Bastioli et al. | 428/219 |
| 2008/0147034 A1* | 6/2008 | Wang et al. | 604/370 |
| 2008/0161449 A1* | 7/2008 | Yamamoto et al. | 524/35 |
| 2008/0287592 A1* | 11/2008 | Favis et al. | 524/500 |
| 2009/0247036 A1* | 10/2009 | Shi et al. | 442/394 |
| 2010/0116708 A1* | 5/2010 | Carcano et al. | 206/557 |
| 2010/0249268 A1* | 9/2010 | Schmidt et al. | 523/128 |
| 2010/0266858 A1* | 10/2010 | Chopinez et al. | 428/457 |

FOREIGN PATENT DOCUMENTS

| | | |
|---|---|---|
| EP | 0554939 A | 8/1993 |
| EP | 0 596 437 | 5/1994 |
| JP | H07-258488 | 10/1995 |
| JP | 06-313063 | 7/1996 |
| JP | 10-077395 | 3/1998 |
| JP | 10-158485 | 6/1998 |
| JP | 11-124485 | 5/1999 |
| JP | 10-152602 | 12/1999 |
| JP | 2003-145534 A | 5/2003 |
| JP | 2006-306965 A | 11/2006 |
| KR | 2000 031 683 | 6/2000 |
| KR | 2003 0022914 | 3/2003 |
| WO | WO 93/03098 | 2/1993 |
| WO | WO 96/31561 | 10/1996 |
| WO | 2005/017034 | 2/2005 |

OTHER PUBLICATIONS

Office Action in Chinese Application 200880112792 dated Aug. 31, 2012.

Office Action in Japanese Application No. JP2010-530438 dated Jul. 30, 2013.

U.S. Appl. No. 12/739,403, filed Jun. 23, 2011, Office Action.

U.S. Appl. No. 12/739,403, filed Jan. 6, 2012, Final Office Action.

* cited by examiner

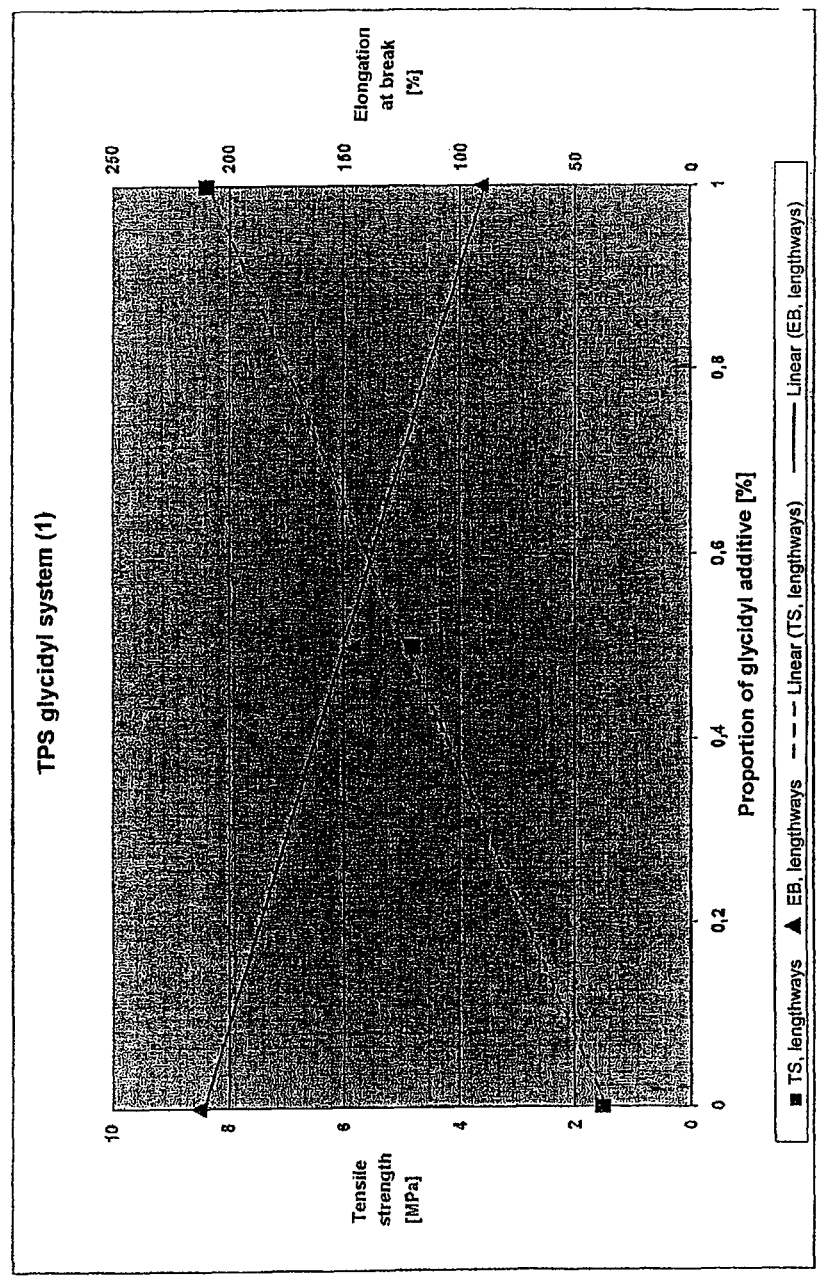
Figur 1

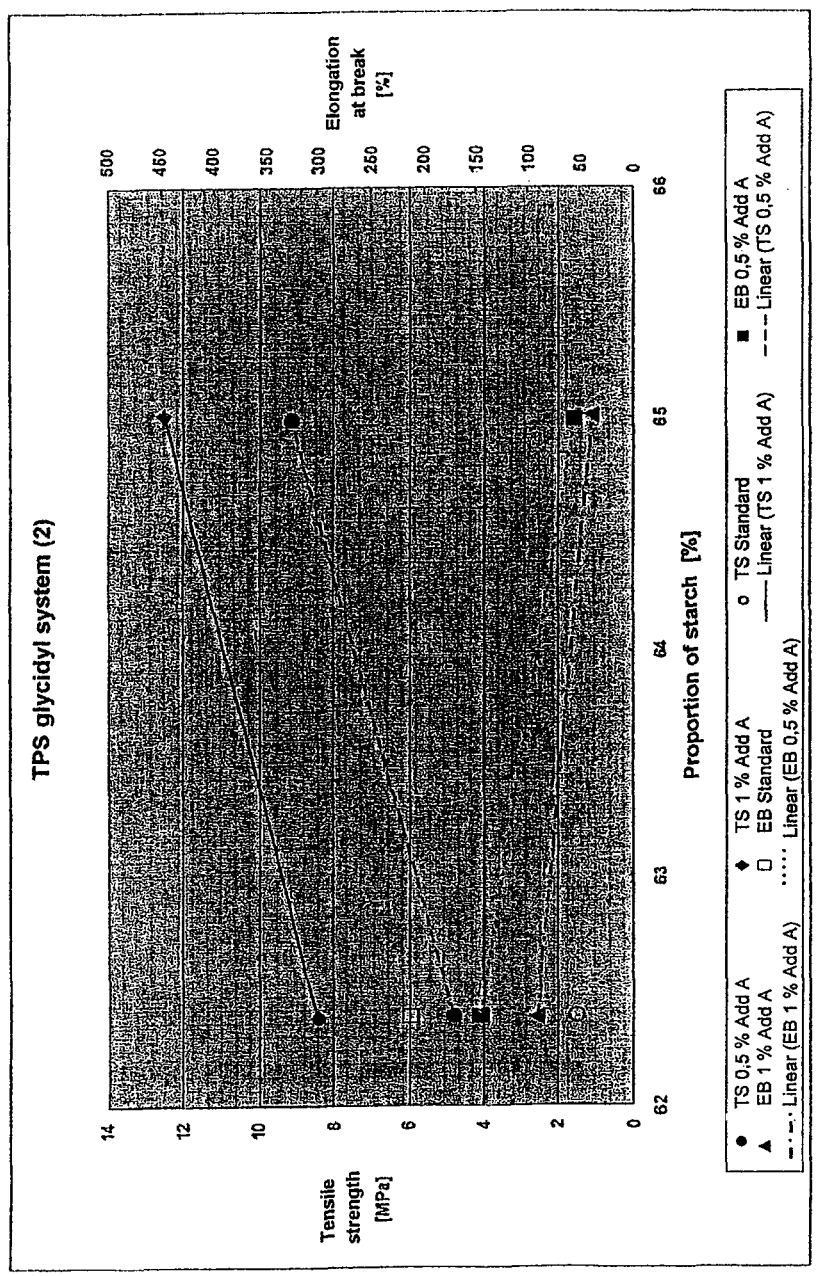
Figur 2

POLYMER MATERIAL AND METHOD FOR THE PRODUCTION THEREOF

The invention relates to a polymer material containing starch, to a method for its production and to molded parts, films and/or fibers produced from the material.

Polymer materials containing starch of the kind mentioned in the preamble are generally known. Thermoplastic starch or thermoplastically processable starch (TPS) in particular ranks among the commercially most important bioplastics. Thermoplastic starch is generally produced from native starch such as, for example, potato starch. In order to be able to thermoplastically process native starch, plasticizers such as sorbitol and/or glycerol are added to it and the mixture is homogenized in an extruder. Thermoplastic starch is characterized by a low water content which in general is less than 12% wt., in particular less than 6% wt. based on the total weight of the thermoplastic starch. The production and properties of thermoplastic starch are described, for example, in the publications EP 0 397 819 B1, WO 91/16375 A1, EP 0 537 657 B1 and EP 0 702 698 B1. Thermoplastic starch is, for example, commercially available in granulate form under the registered trade name "Bioplast® TPS" from Biotec GmbH & Co. KG, Emmerich (Germany).

The object forming the basis of the invention is to improve the mechanical properties of the materials containing starch mentioned in the preamble and of the products produced from them (e.g. molded parts, films and/or fibers).

This object is achieved according to the invention by a polymer material which can be obtained by homogenizing a mixture containing 40 to 85% wt. of starch and/or starch derivative,
15 to 55% wt. of plasticizer and
0.01 to 7% wt. of an epoxide group-containing polymer, by supplying thermal and/or mechanical energy and setting the water content of the mixture to less than approximately 12% wt.

Advantageous embodiments of the invention are described in the dependent claims.

A fundamental characteristic of the polymer material containing starch according to the invention is the addition of an epoxide group-containing polymer during its production. Surprisingly, it has been discovered that the presence of epoxide group-containing polymers as an additive during the production of polymer materials containing starch leads to a significant improvement in the mechanical properties of the material, in particular in its tensile strength and elongation at break.

The polymer material according to the invention is characterized by excellent mechanical properties. Thus, a film produced from the polymer material has a tensile strength in accordance with DIN 53455 of 2 to 10 N/mm², in particular of 4 to 8 N/mm² and/or an elongation at break in accordance with DIN 53455 of 80 to 200%, in particular of 120 to 180%.

The material according to the invention can be obtained by homogenizing a mixture containing starch or starch derivative, plasticizer and epoxide group-containing polymer.

The production of thermoplastic polymers containing starch by homogenizing a starting mixture containing starch is generally known and usually takes place in an extruder. Suitable production methods for thermoplastic polymers containing starch are described, for example, in the publications EP 0 397 819 B1, WO 91/16375 A1, EP 0 537 657 B1 and EP 0 702 698 B1.

The starch and starch derivative used for producing the material according to the invention are preferably selected from native potato starch, tapioca starch, rice starch and maize starch.

According to one preferred embodiment of the invention, the mixture contains 45 to 80% wt., in particular 50 to 75% wt., preferably 55 to 72% wt., more preferably 58 to 70% wt., most preferably 59 to 67% wt. of starch and/or starch derivative.

The plasticizer for producing the material according to the invention is preferably selected from the group consisting of ethylene glycol, propylene glycol, glycerol, 1,4-propanediol, 1,2-butanediol, 1,3-butanediol, 1,4-butanediol, 1,5-pentanediol, 1,5-hexanediol, 1,6-hexanediol, 1,2,6-hexanetriol, 1,3,5-hexanetriol, neopentyl glycol, sorbitol acetate, sorbitol diacetate, sorbitol monoethoxylate, sorbitol diethoxylate, sorbitol hexaethoxylate, sorbitol dipropoxylate, aminosorbitol, trihydroxymethylaminomethane, glucose/PEG, the reaction product of ethylene oxide with glucose, trimethylol propane monoethoxylate, mannitol monoacetate, mannitol monoethoxylate, butylglucoside, glucose monoethoxylate, α-methylglucoside, the sodium salt of carboxymethyl sorbitol, polyglycerol monoethoxylate, erythritol, pentaerythritol, arabitol, adonitol, xylitol, mannitol, iditol, galactitol, allitol, sorbitol, polyvalent alcohols in general, glycerol esters, formamide, N-methylformamide, DMSO, mono- and diglycerides, alkylamides, polyols, trimethyl propane, polyvinyl alcohol having 3 to 20 repeat units, polyglycerols having 2 to 10 repeat units and derivatives and/or mixtures thereof. In particular, glycerol and/or sorbitol are considered as the plasticizer.

The plasticizer preferably has a solubility parameter (Hildebrand parameter) d(SI) of 30 to 50 MPa$^{1/2}$ within a temperature range of approximately 150 to 300° C.

The plasticizer content in the mixture is preferably 20 to 50% wt., in particular 25 to 45% wt., more preferably 28 to 42% wt., even more preferably 30 to 40% wt. and most preferably 35 to 38% wt. based on the total composition.

The polymer material according to the invention also contains an epoxide group-containing polymer, this preferably being an epoxide group-containing copolymer. Epoxide group-containing polymers or copolymers especially considered are those having a molecular weight ($M_w$) of 1,000 to 25,000, in particular 3,000 to 10,000.

Preferably, the epoxide group-containing polymer is a glycidyl (meth)acrylate-containing polymer. A suitable glycidyl (meth)acrylate-containing polymer is, for example, a copolymer consisting of (a) styrene and/or ethylene and/or methyl methacrylate and/or methyl acrylate and (b) glycidyl (meth) acrylate. Particularly well suited as the glycidyl (meth)acrylate-containing polymer is a copolymer which is selected from the group consisting of styrene-methyl methacrylate-glycidyl methacrylate, ethylene-methyl acrylate-glycidyl methacrylate and ethylene-glycidyl methacrylate. Glycidyl (meth)acrylate is preferably contained therein in a quantity of 1 to 60% wt., in particular 5 to 55% wt., more preferably 45 to 52% wt. based on the total composition of the glycidyl (meth) acrylate-containing polymer.

Epoxide group-containing copolymers based on styrene, ethylene, acrylic ester and/or methacrylic ester are also considered as epoxide group-containing polymers.

The mixture preferably contains 0.01 to 5% wt., in particular 0.05 to 3% wt., more preferably 0.1 to 2% wt. of epoxide group-containing polymer, based on the total composition.

The mixture, in addition to the principal constituents of starch or starch derivative, plasticizer, epoxide group-containing polymer and water, can contain more common additives such as, for example, processing aids, plasticizers, stabilizers, flame retardants and/or fillers.

The mixture can also contain other polymer materials, in particular biologically degradable thermoplastic polymers.

In this way, polymer blends can be produced which contain thermoplastic starch and at least one other thermoplastic material, in particular thermoplastic polyester. In particular, biologically degradable thermoplastic polymers such as polyesters, polyester amides, polyester urethanes and/or polyvinyl alcohol can be added as further thermoplastic material. However, the mixture besides thermoplastic starch preferably contains no further biologically degradable thermoplastic polymers, in particular no further thermoplastic polymers which are biologically degradable in accordance with EN 13432. According to another preferred embodiment, besides thermoplastic starch the mixture contains no further thermoplastic polymers.

The mixture is homogenized during the production of the polymer material according to the invention. Homogenization can be carried out by means of any procedures familiar to the person skilled in the art who is active in the field of plastics technology. Preferably, the mixture is homogenized by dispersing, stirring, kneading and/or extruding. According to a preferred embodiment of the invention, shear forces act on the mixture during homogenization. Suitable production methods for thermoplastic polymers containing starch, which can also be analogously applied to the production of the polymer material according to the invention, are described, for example, in the publications EP 0 397 819 B1, WO 91/16375 A1, EP 0 537 657 B1 and EP 0 702 698 B1.

According to a preferred embodiment of the invention, the mixture is heated during homogenization (e.g. in the extruder), preferably to a temperature of 90 to 200° C., in particular 120 to 180° C., more preferably 130 to 160° C.

During the production of the polymer material according to the invention, the water content of the mixture is set to less than approximately 12% wt. Preferably, the water content of the mixture is set to 0.5 to 12% wt., in particular 1 to 7% wt., more preferably 1.5 to 6% wt., most preferably 1.5 to 3% wt.

It has been established that with the specified water contents (in particular <6% wt.), improved flow behavior of the material in the extruder and reduced formation of microbubbles can be obtained.

Preferably, the water content of the mixture is set to at least 1% wt., in particular at least 1.5% wt., since otherwise thermally caused oxidation processes accompanied by undesired discoloration of the product can easily occur.

Preferably, the water content is set by drying during homogenization. The drying process can be carried out, for example, by degassing the mixture or the melt, advantageously by removing the water vapor during extrusion.

According to another preferred embodiment of the invention, the polymer material according to the invention has thermoplastic properties. Preferably, the material can be thermoplastically processed.

The polymer materials according to the invention are suitable for the most varied purposes. In particular, the materials according to the invention are suitable for producing molded parts, films or fibers. The invention thus relates to molded parts, films or fibers which are produced from the materials according to the invention. Finally, the invention also relates to a method for producing a polymer material, which is characterized by the following method steps:

(a) Producing a mixture containing
40 to 85% wt. of starch and/or starch derivative
15 to 55% wt. of plasticizer and
0.01 to 7% wt. of an epoxide group-containing polymer, (b) Homogenizing the mixture by supplying thermal and/or mechanical energy and (c) Setting the water content of the mixture to less than approximately 12% wt.

The invention will be subsequently described in more detail by means of exemplary embodiments.

EXAMPLE 1

Producing Glycidyl-Containing Thermoplastic Starch (TPS)

A mixture consisting of native potato starch, glycerol, sorbitol and epoxide group-containing copolymer based on styrene-methyl methacrylate-glycidyl methacrylate in the proportions specified below was filled into a twin-screw extruder. A random copolymer based on styrene-methyl methacrylate-glycidyl methacrylate having a molecular weight $M_w$ of approximately 6,800 and an epoxy group equivalent weight of 285 g/mol (additive A) was added as the epoxide group-containing polymer (glycidyl additive). The mixture was intensively mixed in the extruder within a temperature range from 130 to 160° C., wherein the melt was degassed at the same time in order to dehydrate the mixture. A homogenous melt was formed which could be extracted and granulated. The water content of the compound homogenized in the way described and thermoplastically processed was between 2 and 4% wt.

By mixing and homogenizing the native starch with glycerol and sorbitol, crystalline structures of the starch were broken up, so that the resulting thermoplastic starch was to a large extent present in amorphous form. In contrast to this, de-structured starch which can be produced from native starch, for example by heating in water, still has a certain amount of crystallinity. The addition of glycidyl-containing polymer causes intra- and inter-molecular chemical cross-linking of starch, glycerol and sorbitol, which has a significant effect on the mechanical properties of the thermoplastic starch produced.

From the material produced, films having a thickness of approximately 250 μm were manufactured by flat film extrusion.

For this, the granulate was conveyed into a single-screw extruder (L/D=24, intake cooled, screen with perforated plate, 450 μm), melted at 155° C., extended over a sheet die ("coat hanger geometry"), die gap 0.25 mm, to form the flat film and removed.

EXAMPLE 2

Effect of the Glycidyl Additive on the Mechanical Properties of Films Made of Thermoplastic Starch (TPS)

A thermoplastic starch was produced consisting of native potato starch (70% wt.), glycerol (23.5% wt.), sorbitol (5.5 to 6.5% wt.) and epoxide group-containing copolymer based on styrene-methyl methacrylate-glycidyl methacrylate as the glycidyl additive according to the method described in Example 1. The proportion of glycidyl additive was varied in the course of this between 0 and 1% wt. at the expense of sorbitol.

A random copolymer based on styrene-methyl methacrylate-glycidyl methacrylate having a molecular weight $M_w$ of approximately 6,800 and an epoxy group equivalent weight of 285 g/mol (additive A) was used as the epoxide group-containing polymer (glycidyl additive).

After compounding the different composition variants, films were produced and characterized.

In the first sub-test, the mechanical properties tensile strength (TS) and elongation at break (EB) of TPS films with different proportions of glycidyl additive were determined. FIG. 1 shows the resulting plotted graph.

It becomes apparent from FIG. 1 that an increase in the concentration of the glycidyl additive is accompanied by an increase in the tensile strength with a simultaneous decrease in the elongation at break (elasticity). Whilst with an increasing glycidyl additive content the tensile strength increases linearly, the elongation at break decreases linearly.

Without being tied to a specific theory, this effect based on current knowledge is explained as follows: it is assumed that the glycidyl additive has markedly reacted with the thermoplastic starch. Alcohol functions of the starch and of the plasticizer, which is also contained in the composition, are sufficiently available to the epoxide groups of the chain lengthener for a reaction.

It is unlikely that an exclusive or preferred reaction of the glycidyl additive with the low-molecular plasticizer (glycerol, sorbitol) of the thermoplastic starch (proportion of the reactive alcohol groups starch:plasticizer in the composition approx. 1.6:1) would have had such a significant effect on the mechanical properties determined (maximum chosen additive content of the composition only 1% wt.). Rather, the increase in tensile strength with a simultaneous decrease in the elongation at break (elasticity) can be explained by covalent cross-linking of the starch (intra- and inter-molecularly) brought about by the additive.

EXAMPLE 3

Effect of the Starch Content in Glycidyl-Containing Thermoplastic Starch on the Mechanical Properties of Films Produced from this In a second test, the effect of an increased proportion of starch in glycidyl-containing thermoplastic starch on the mechanical properties of corresponding films was determined.

A thermoplastic starch consisting of native potato starch (62.4 to 65.5% wt.), glycerol (30.6% wt.), sorbitol (2.9 to 6.5% wt.) and epoxide group-containing copolymer as the glycidyl additive (0.5% and 1.0% wt.) was produced according to the method described in Example 1. The proportion of native potato starch was varied in the course of this between 62.4 and 65.5% wt. at the expense of sorbitol. The proportion of glycidyl additive also varied at the expense of sorbitol between 0.5 and 1.0% wt.

A random copolymer based on styrene-methyl methacrylate-glycidyl methacrylate having a molecular weight $M_w$ of approximately 6,800 and an epoxy group equivalent weight of 285 g/mol (additive A) was used as the epoxide group-containing polymer (glycidyl additive).

As a comparison composition, thermoplastic starch (TPS) was produced without glycidyl additive, consisting of native potato starch (62.4% wt.), glycerol (22.8% wt.) and sorbitol (14.8% wt.) according to the procedure described in Example 1 (Standard TPS).

The results are plotted in FIG. 2.

It becomes apparent from FIG. 2 that by increasing the starch content the tensile strength of the TPS film, already multiplied by the glycidyl additive, can be further increased. The elongation at break, for a standard film greater than 200%, sinks in the test carried out to approx. 50%. The strength values obtained in Example 2 (F 1) can therefore be additionally increased by increasing the starch content. The elasticity of the films (elongation at break) decreases correspondingly.

From the results, it can be established based on the tests carried out that the glycidyl additive used has a significant effect on the mechanical properties of TPS films. By admixing 0.5% (1%) glycidyl additive to the TPS composition the tensile strength can be more than doubled (quadrupled). Correspondingly, the additive reduces the elasticity of the film by 25% (50%). In the area investigated, the effects run proportionally or anti-proportionally to the concentration of additive. They can be boosted further by increasing the proportion of starch.

The invention has been described above by means of exemplary embodiments. At the same time, it is to be understood that the invention is not limited to the exemplary embodiments described. Rather, varied options for modification and refinement arise within the scope of the invention for the person skilled in the art and the scope of protection for the invention is, in particular, defined by the subsequent claims.

The invention claimed is:

1. Polymer material which is obtainable by a process comprising:
   homogenizing a mixture comprised of:
      40 to 85 wt. % of starch and/or starch derivative,
      15 to 55 wt. % of plasticizer, and
      0.01 to 7 wt. % of an epoxide group-containing polymer having a molecular weight (Mw) of 1,000 to 25,000,
   said homogenizing being performed by supplying thermal and/or mechanical energy to the mixture and setting the water content of the mixture to less than approximately 7 wt. %.

2. Polymer material which is obtainable by a process comprising:
   homogenizing a mixture comprised of:
      50 wt. % to 85 wt. % of starch and/or starch derivative,
      15 to 50 wt. % of plasticizer, and
      0.01 to 7 wt. % of an epoxide group-containing polymer,
   said homogenizing being performed by supplying thermal and/or mechanical energy to the mixture and setting the water content of the mixture to less than approximately 7 wt. %.

3. Polymer material according to claim 2, wherein the mixture comprises 50 to 80 wt. % of the starch and/or starch derivative.

4. Polymer material according to claim 2, wherein the mixture comprises 20 to 50 wt. % of the plasticizer.

5. Polymer material according to claim 2, wherein the mixture comprises contains 0.01 to 5 wt. % of the epoxide group-containing polymer.

6. Polymer material according to claim 2, wherein the polymer material is biologically degradable in accordance with EN 13432.

7. Polymer material according to claim 2, wherein the plasticizer is selected from the group consisting of ethylene glycol, propylene glycol, glycerol, 1,4-propanediol, 1,2-butanediol, 1,3-butanediol, 1,4-butanediol, 1,5-pentanediol, 1,5-hexanediol, 1,6hexanediol, 1,2,6-hexanetriol, 1,3,5-hexanetriol, neopentyl glycol, sorbitol acetate, sorbitol diacetate, sorbitol monoethoxylate, sorbitol diethoxylate, sorbitol hexaethoxylate, sorbitol dipropoxylate, aminosorbitol, trihydroxymethylaminomethane, glucose/PEG, the reaction product of ethylene oxide with glucose, trimethylol propane monoethoxylate, mannitol monoacetate, mannitol monoethoxylate, butylglucoside, glucose monoethoxylate, α-methylglucoside, the sodium salt of carboxymethyl sorbitol, polyglycerol monoethoxylate, erythritol, pentaerythritol, arabitol, adonitol, xylitol, mannitol, iditol, galactitol, allitol, sorbitol, polyvalent alcohols in general, glycerol esters, formamide, N-methylformamide, DMSO, mono-and diglycerides, alkylamides, polyols, trimethyl propane, polyvinyl alcohol having 3 to 20 repeat units, polyglycerols having 2 to 10 repeat units, derivatives thereof, and mixtures thereof.

8. Polymer material according to claim 2, wherein the plasticizer has a solubility parameter (Hildebrand parameter) d(SI) of 30 to 50 MPa$^{1/2}$ within a temperature range of approximately 150 to 300° C.

9. Polymer material according to claim 2, wherein the mixture contains glycerol and/or sorbitol as the plasticizer.

10. Polymer material according to claim 2, wherein the water content of the mixture is set to 1 to 7 wt. %.

11. Polymer material according to claim 2, wherein the epoxide group-containing polymer is a copolymer.

12. Polymer material according to claim 2, wherein the epoxide group-containing polymer is a glycidyl (meth)acrylate-containing polymer.

13. Polymer material according to claim 12, wherein the glycidyl (meth)acrylate-containing polymer is a copolymer comprised of (a) styrene and/or ethylene and/or methyl methacrylate and/or methyl acrylate and (b) glycidyl (meth)acrylate.

14. Polymer material according to claim 12, wherein the glycidyl (meth)acrylate-containing polymer is an epoxide group-containing copolymer based on styrene, ethylene, acrylic ester and/or methacrylic ester.

15. Polymer material according to claim 12, wherein the glycidyl (meth)acrylate-containing polymer is a copolymer selected from the group consisting of styrene-methyl methacrylate-glycidyl methacrylate, ethylene-methyl acrylate-glycidyl methacrylate and ethylene-glycidyl methacrylate.

16. Polymer material according to claim 12, wherein the glycidyl (meth)acrylate-containing polymer contains glycidyl (meth)acrylate in a quantity of 1 to 60 wt. % based on the total composition of the glycidyl (meth) acrylate-containing polymer.

17. Polymer material according to claim 12, wherein the glycidyl (meth)acrylate-containing polymer contains glycidyl (meth)acrylate in a quantity of 5 to 55 wt. % based on the total composition of the glycidyl (meth) acrylate-containing polymer.

18. Polymer material according to claim 12, wherein the glycidyl (meth)acrylate-containing polymer contains glycidyl (meth)acrylate in a quantity of 45 to 52 wt. % based on the total composition of the glycidyl (meth) acrylate-containing polymer.

19. Polymer material according to claim 2, wherein the epoxide group-containing polymer has a molecular weight (Mw) of 1,000 to 25,000.

20. Polymer material according to claim 2, wherein the mixture is homogenised by dispersing, stifling, kneading and/or extruding.

21. Polymer material according to claim 2, wherein the mixture is homogenised by extrusion.

22. Polymer material according to claim 2, wherein the mixture is homogenized by shear forces acting on the mixture.

23. Polymer material according to claim 2, wherein during homogenization or subsequent extrusion the mixture is heated to a temperature of 90 to 200° C.

24. Polymer material according to claim 2, wherein the water content of the mixture is set to less than 5 wt. %.

25. Polymer material according to claim 2, wherein the water content of the mixture is set during homogenization.

26. Polymer material according to claim 2, wherein the water content of the mixture is set by degassing the mixture.

27. Polymer material according to claim 2, wherein the water content of the mixture is set by drying the mixture during homogenization or subsequent extrusion.

28. Polymer material according to claim 2, wherein the polymer material can be thermoplastically processed.

29. Polymer material according to claim 2, wherein the polymer material is a film having a tensile strength in accordance with DIN 53455 of 2 to 10 N/mm$^2$.

30. Polymer material according to claim 2, wherein the polymer material is a film having an elongation at break in accordance with DIN 53455 of 80 to 200%.

31. Polymer material according to claim 2, wherein the polymer material is in the form of an article of manufacture selected from the group consisting of molded parts, films, and fibers.

32. Polymer material according to claim 2, wherein the mixture comprises 50 to 75 wt. % of the starch and/or starch derivative.

33. Polymer material according to claim 2, wherein the mixture comprises 55 to 72 wt. % of the starch and/or starch derivative.

34. Polymer material according to claim 2, wherein the mixture comprises 59 to 67 wt. % of the starch and/or starch derivative.

35. Polymer material according to claim 2, wherein the mixture contains 25 to 45 wt. % of the plasticizer.

36. Polymer material according to claim 2, wherein the mixture contains 28 to 42 wt. % of the plasticizer.

37. Polymer material according to claim 2, wherein the mixture contains 30 to 40 wt. % of the plasticizer.

38. Polymer material according to claim 2, wherein the mixture contains 35 to 38 wt. % of the plasticizer.

39. Polymer material according to claim 2, wherein the mixture contains 0.05 to 3 wt. % of the epoxide group-containing polymer.

40. Polymer material according to claim 2, wherein the mixture contains 0.1 to 2 wt. % of the epoxide group-containing polymer.

41. Polymer material according to claim 2, wherein the water content of the mixture is set to 1.5 to 6 wt. %.

42. Polymer material according to claim 2, wherein the water content of the mixture is set to 1.5 to 3 wt %.

43. Polymer material according to claim 2, wherein the epoxide group-containing polymer has a molecular weight (Mw) of 3,000 to 10,000.

44. Polymer material according to claim 2, wherein during homogenization or subsequent extrusion the mixture is heated to a temperature of 120 to 180° C.

45. Polymer material according to claim 2, wherein during homogenization or subsequent extrusion the mixture is heated to a temperature of 130 to 160° C.

46. Polymer material according to claim 2, wherein the water content of the mixture is set to less than 3 wt. %.

47. Polymer material according to claim 2, wherein the water content of the mixture is set by degassing the mixture while in the form of a melt.

48. Polymer material according to claim 2, wherein the polymer material is a film having a tensile strength in accordance with DIN 53455 of 4 to 8 N/mm$^2$.

49. Polymer material according to claim 2, wherein the polymer material is a film having an elongation at break in accordance with DIN 53455 of 120 to 180%.

50. Method for producing a polymer material comprising:
    (a) producing a mixture comprised of:
        45 wt. % to 85 wt. % of starch and/or starch derivative;
        15 to 55 wt. % of plasticizer; and
        0.01 to 7% wt. of an epoxide group-containing polymer,
    (b) homogenizing the mixture by supplying thermal and/or mechanical energy; and
    (c) setting the water content of the mixture to less than approximately 7 wt. %.

* * * * *